United States Patent [19]

Supper et al.

[11] Patent Number: 6,025,815
[45] Date of Patent: Feb. 15, 2000

[54] DRIVE UNIT FOR ADJUSTING SATELLITE COMPONENTS REQUIRING ORIENTATION

[75] Inventors: Ludwig Supper, Vienna; Christian Schwarzinger, Gumpoldskirchen, both of Austria

[73] Assignee: Austrian Aerospace Ges.m.b.H., Austria

[21] Appl. No.: 09/051,217

[22] PCT Filed: Oct. 3, 1996

[86] PCT No.: PCT/AT96/00181

§ 371 Date: Jun. 18, 1998

§ 102(e) Date: Jun. 18, 1998

[87] PCT Pub. No.: WO97/12806

PCT Pub. Date: Apr. 10, 1997

[30] Foreign Application Priority Data

Oct. 4, 1995 [AT] Austria .................................. 538/95 U

[51] Int. Cl.[7] ...................................................... H01Q 1/08
[52] U.S. Cl. .......................... 343/882; 343/878; 343/880
[58] Field of Search .................................... 343/765, 757, 343/754, 880, 881, 882, 761, 878, 890; 248/184, 371, 396

[56] References Cited

U.S. PATENT DOCUMENTS

| | | |
|---|---|---|
| 4,251,819 | 2/1981 | Vickland .................................. 343/882 |
| 4,360,182 | 11/1982 | Titus ........................................ 248/371 |
| 4,582,291 | 4/1986 | Matthews ................................. 343/765 |
| 4,726,259 | 2/1988 | Idler ........................................ 343/882 |
| 4,783,662 | 11/1988 | Wirth et al. ............................. 343/757 |
| 5,131,611 | 7/1992 | Vollaro ................................. 248/158 R |
| 5,310,144 | 5/1994 | Salvatore et al. ....................... 343/882 |
| 5,579,018 | 11/1996 | Francis et al. .......................... 343/757 |

FOREIGN PATENT DOCUMENTS

| | | |
|---|---|---|
| 0 043 772 | 1/1982 | European Pat. Off. . |
| 0 424 937 | 5/1991 | European Pat. Off. . |
| 0 515 888 | 12/1992 | European Pat. Off. . |
| 2 502 404 | 9/1982 | France . |
| 2 127 624 | 4/1984 | United Kingdom . |

*Primary Examiner*—Don Wong
*Assistant Examiner*—Tho Phan
*Attorney, Agent, or Firm*—Nixon & Vanderhye P.C.

[57] ABSTRACT

A drive unit for adjusting satellite components requiring orientation such as thrusts includes two linear drives on which steering rods are articulated via gimbals. The rods, like the additional bracing struts, are connected via globe joints to the components requiring orientation such as the platform of the thrusters. An alternative or additional articulation is provided via a globe joint on the main satellite body.

6 Claims, 5 Drawing Sheets

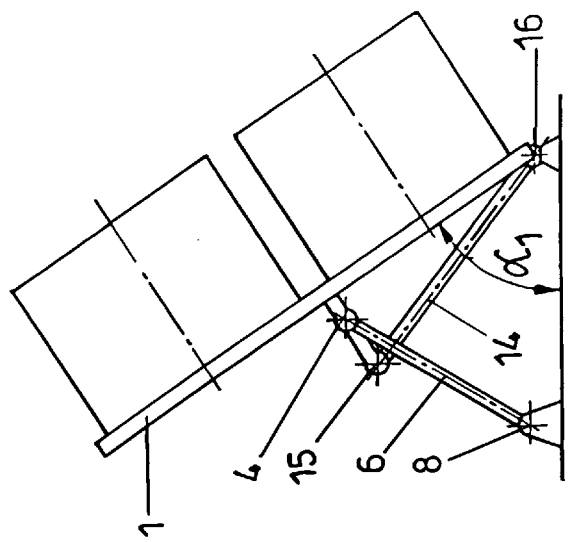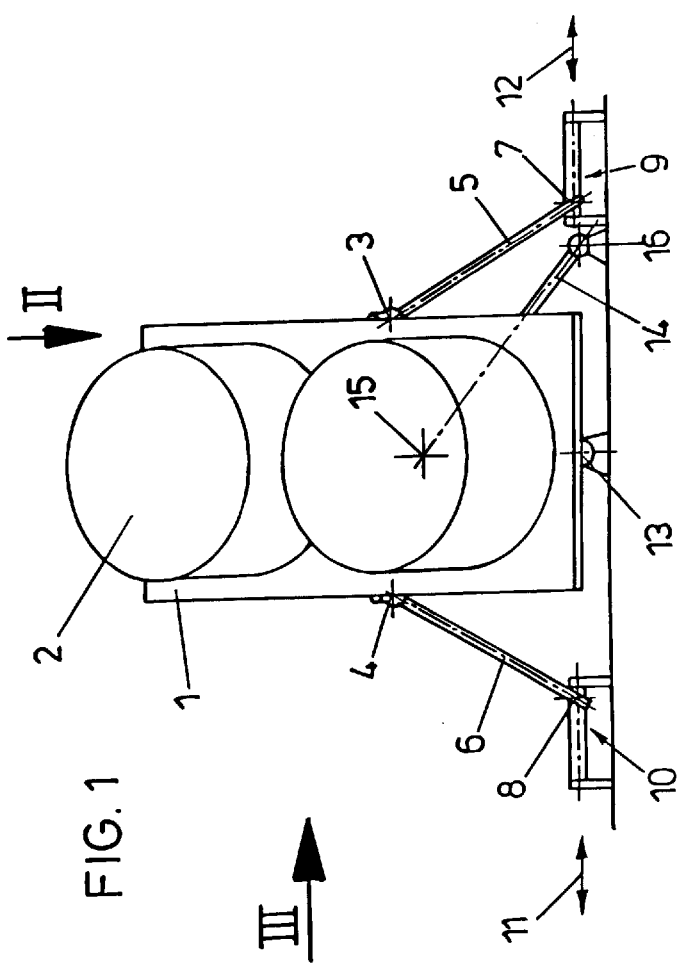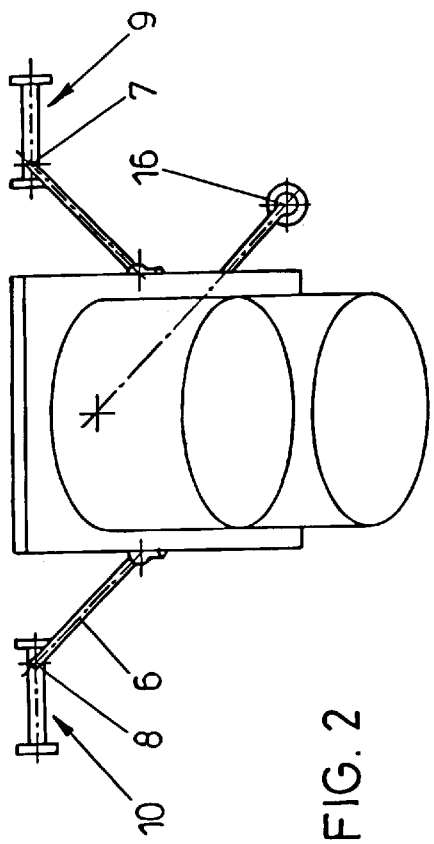

DRIVE UNIT FOR ADJUSTING SATELLITE COMPONENTS REQUIRING ORIENTATION

The invention relates to an actuation device for adjusting satellite structural members to be oriented such as, e.g., driving apparatus (propulsion units), antennas or solar cells.

BACKGROUND AND SUMMARY OF THE INVENTION

In order to correct maladjustments of a satellite, it is known to arrange a number of driving apparatus i.e., propulsion units on satellites. In addition to chemical driving apparatus, which eject huge masses of fuel during operation, ion engines have been employed, which must be operated over a relatively long period of time in order to obtain correction. Ion engines, as a rule, are built heavier than chemical propellants. Since ion engines eject slight amounts of noble gas, the demand of fuel to be taken along, i.e., noble gases, is smaller in terms of mass if the drive or actuator is to be capable of functioning over an extended period of time. Thus, heavier-design ion engines are opposed by the weight advantage in terms of the fuel amount to be taken along such that even heavy-design ion engines have been employed for a number of corrections in the meantime, in particular, with satellites whose operating time in space is longer than that of previous satellites.

Chemical driving apparatus of known construction, as a rule, are operated in a pulsating manner in order to correct maladjustments in that manner. What is, however, essential to the correction of maladjustments is the safe avoidance of undesired movements and, in particular, undesired rotary movements during, or on account of, the operation of the driving apparatus. The driving apparatus, therefore, must be accurately oriented, the forces of the driving apparatus having to be brought into an aligned relationship with the center of gravity of the satellite, which changes during operation. Since the position of the center of gravity itself changes, for instance, due to fuel consumption and, vice versa, also the driving apparatus are subject to changes in their axial orientation due to external influences and driving apparatus wear, the relative position of the forces acting upon operation of the driving apparatus, relative to the changing center of gravity on account of resulting movements of the satellite must be constantly detected in order to take additional corrective measures. Essential to such corrections is, however, a simple, operationally safe and lightweight-design actuation device, by means of which the desired corrections can be effected by the orientation of driving apparatus.

In addition to heavy-weight ion engines, other structural members such as, for instance, antennas or solar cells must also be oriented in case of need, wherein also a compact actuator of simple construction (and as insensitive to disturbances as possible) is required to move larger devices.

The invention aims at providing an actuation device of the initially defined kind, by which even relatively heavy satellite structural members that are to be oriented can safely be brought into the desired orientation by means of a slight number of simple and operationally safe structural members of lightweight design.

To solve this object, the configuration according to the invention essentially consists in that the actuation device comprises two independently operable linear actuators including guiding rods cardanically linked to the linear actuators and supported on, or cardanically linked to, various points of the structural member via ball-and-socket joints, as well as at least one supporting rod, wherein the supporting rod(s) are supported on, or cardanically linked to, various points both on the satellite and on the structural member to be oriented via ball-and-socket joints, and/or the structural member to be oriented is supported in, or cardanically linked to, one point directly on the satellite via a ball-and-socket joint, and that the guiding rods and the supporting rod(s) engage at points of the structural member to be oriented, that form a polygon, wherein the angular positions of the guiding rods (5, 6) relative to each other and relative to the linear drives (9, 10) are such that angular displacements of the structural member relative to the satellite are feasible about several axes. By providing two linear actuators, actuators of simple and compact design will do. By linking the guiding rods, which are connected with the linear actuators, cardanically with these actuators, even high reaction forces may be taken up without involving the risk of the actuators being destroyed. By a suitable choice of the angular positions of the guiding rods relative to the linear actuators, relatively small angular adjustments are safely feasible in several axes of space at relatively large adjusting movements of a linear actuator, the displacement path of the linear actuator naturally having to be converted into the respective correction of the angular position by calculation. The safe support of the reaction forces at a simultaneously high precision of the adjustment by small angular increments has become feasible in that the guiding rods and the supporting rod(s) engage at points of the structural member to be oriented, that form a polygon. On the whole, such an actuation device preferably is suitable for aligning ion engines to position a satellite in a largely geostationary manner out of the equator. In those cases, regular or even constant corrections are required in order to keep the satellites in the direction of the meridian, i.e., in the north-south direction, each on the northern or southern hemisphere, respectively, since the plane of the orbit passes through the plane of the equator. Ion engines bring about relatively slow corrections, the actuator, as a rule, being operated for about three hours every twelve hours. In a particularly simple manner, the linear actuators may be comprised of step motors actuating spindle drives. With spindle drives, a relatively long displacement path may, thus, be converted into relatively small angular displacements, wherein a high operating safety will be obtained in that the linear actuators are designed as spindle drives and the guiding rods are connected with the actuator so as to be pivotable about an axis intersecting with, or crossing, the spindle axis.

In a structurally particularly simple manner, the configuration may be such that the linear actuators are arranged in a common plane and, preferably, coaxial with each other, wherein the articulated connections of the guiding rods and the supporting rods with the structural member to be oriented are designed as ball-and-socket joints. In addition to the cardan joints intended for the safe absorption of the reaction forces in the region of the spindle drives, the use of ball-and-socket joints on the remaining articulation sites, thus, guarantees a high degree of precision in terms of force introduction without overstressing lightweight-design guiding or supporting rods.

According to the invention, relatively simple three-axial correction and orientation may be achieved in that a supporting rod and a further articulated supporting means of the structural member to be oriented, relative to the satellite are provided. Advantageously, each actuator cooperates with the structural member to be oriented via a four-bar arch.

In the following, the invention will be explained in more detail by way of an exemplary embodiment schematically represented in the drawings.

BRIEF DESCRIPTION OF THE DRAWINGS

FIG. 1 illustrates a first position of the actuators, guiding rods and supporting rods, relative to a schematically indicated ion beam engines;

FIG. 2 is a view in the direction of arrow II of FIG. 1;

FIG. 3 is a side view in the direction of arrow III of FIG. 1;

DETAILED DESCRIPTION OF THE DRAWINGS

Figure 6:
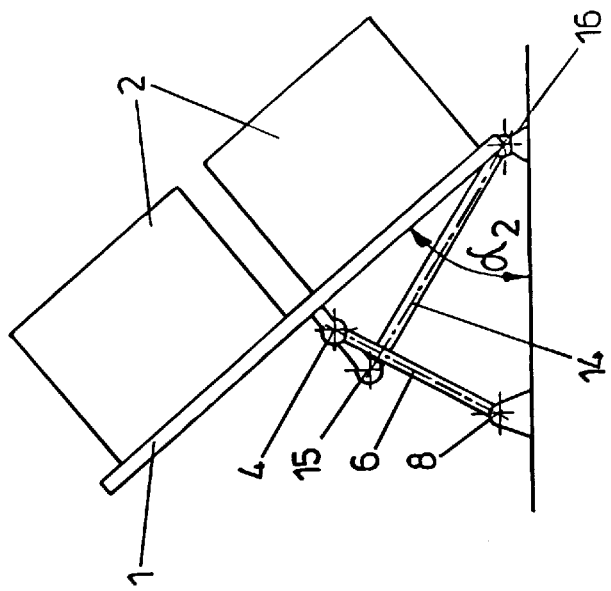
FIGS. 4, 5 and 6, 7, 8 and 9, 10, 11 and 12 as well as 13, 14 and 15, respectively, each show various positions of the linear actuators as well as the resulting adjustment of the carrier platform and of the axes of the driving apparatus.

In FIG. 1, the carrier plate of ion beam engines 2 is schematically denoted by 1. The platform 1 is connected with guiding rods 5 and 6 via ball-and-socket joints 3 and 4. The guiding rods 5 and 6 are each connected with a spindle drive schematically indicated by 9 respectively 10 via a cardan joint 7 respectively 8. Adjustment of the cardan joint axes of the cardan joints 7 and 8, which cross or intersect the spindle axes, is effected in the direction of the double arrow 11 respectively 12. The axes of the spindle drives 9 and 10 as represented in the Figures of the drawing are substantially coaxial.

The carrier platform 1 is additionally supported via a ball-and-socket joint 13 as well as a supporting rod 14, the supporting rod 14 being supported on the carrier plate 1 in a ball-and-socket joint 15 and on the satellite in a ball-and-socket joint 16. These reference numerals have been uniformly retained in the remaining Figures of the drawing such that in the following reference need be made only to the various orientations obtainable by adjusting the cardan joints 7 and 8 of the guiding rods 5 respectively 6 along the spindle in the direction of double arrows 11 respectively 12.

Figure 4:
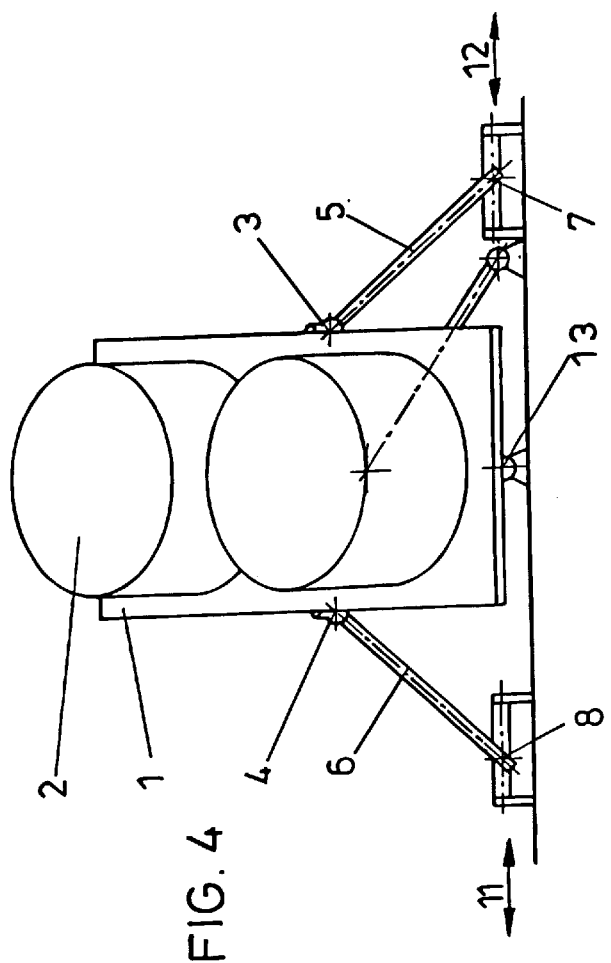
Figure 5:
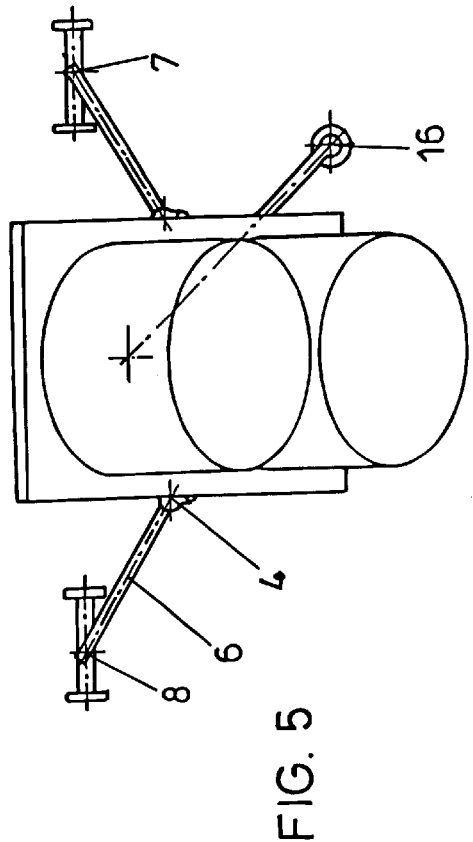
Figure 9:
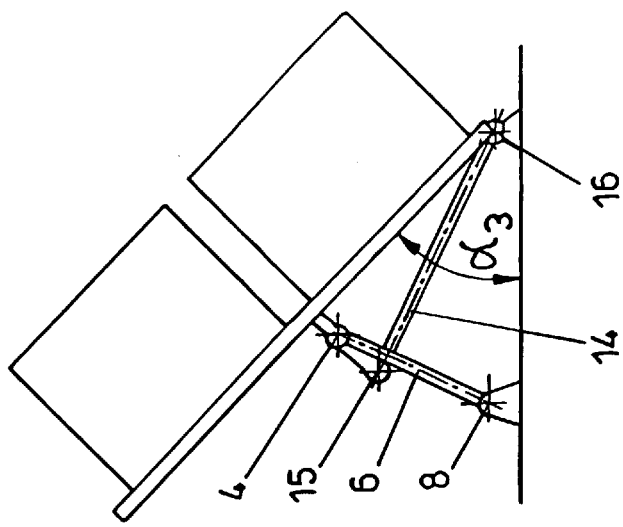
Figure 7:
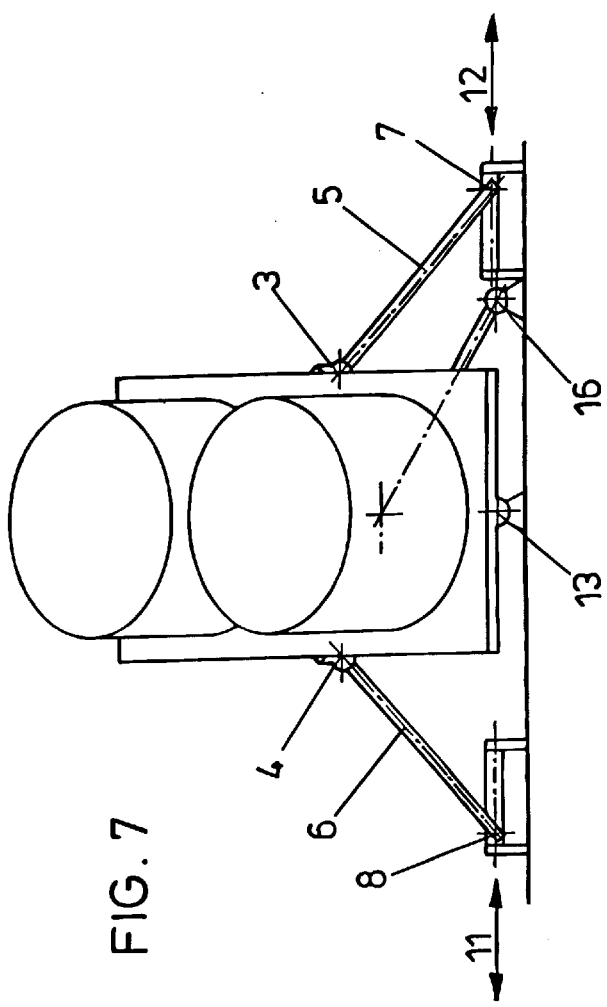
Figure 8:
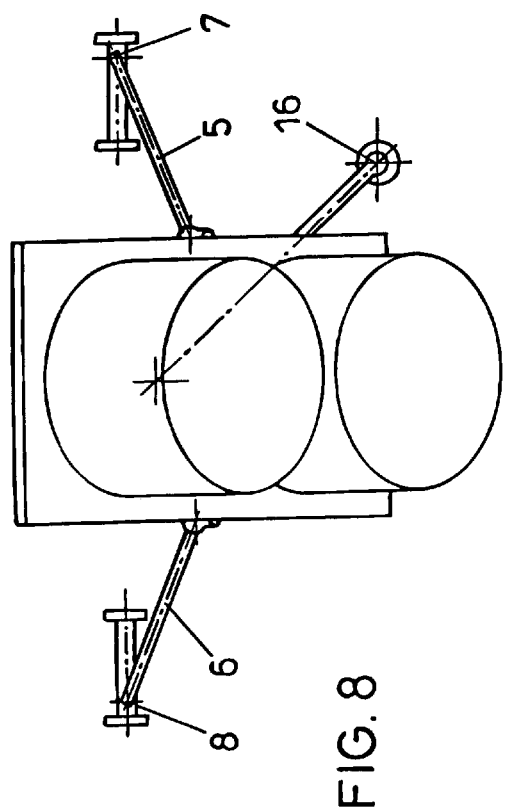
Figure 12:
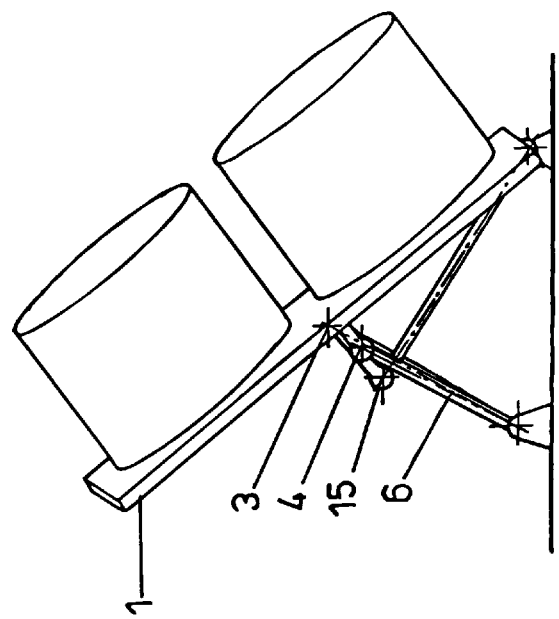
Figure 10:
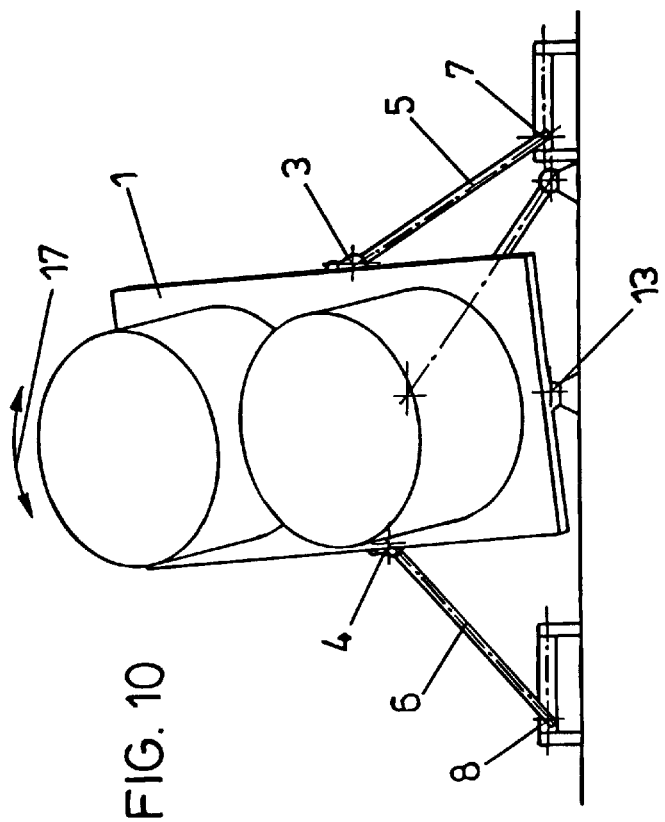
Figure 11:
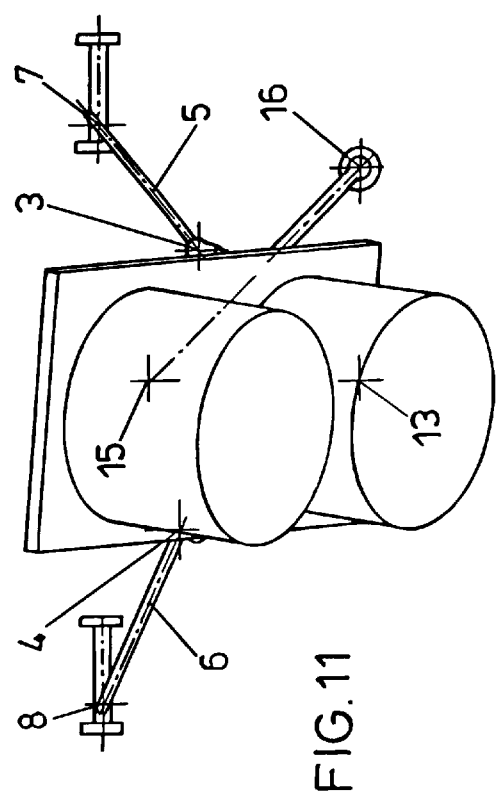
Figure 15:
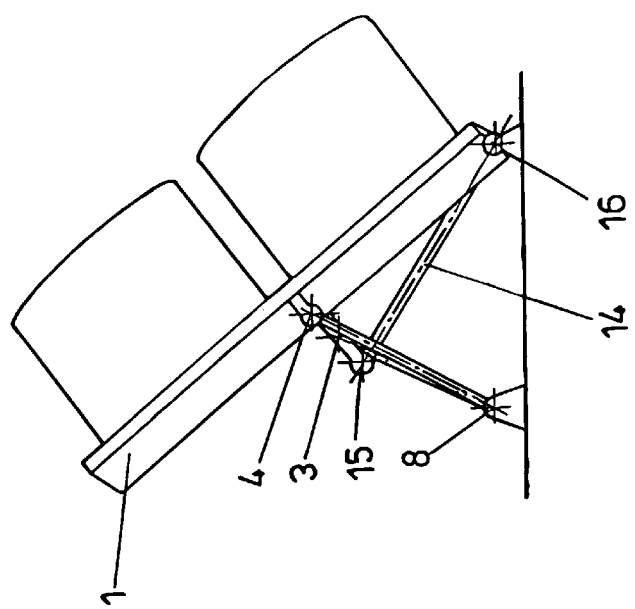
Figure 13:
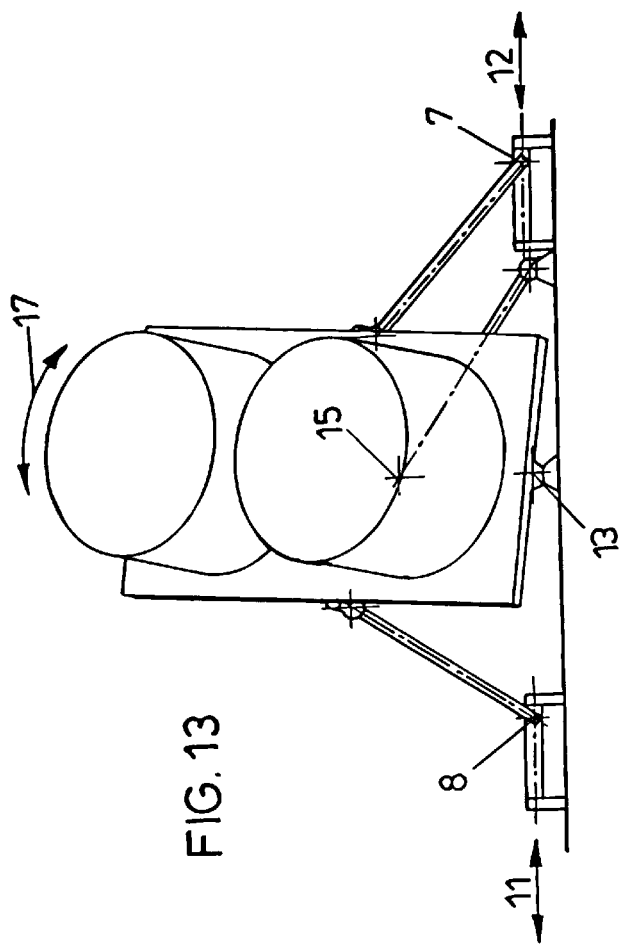
Figure 14:
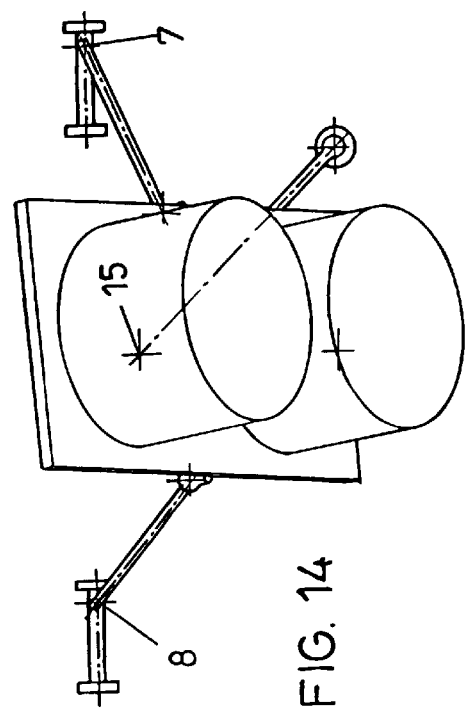

The position depicted in FIGS. 1 to 3, in which the universal joints 7 respectively 8 have been drawn in their positions next to each other, results in a pivotal movement of the carrier platform 1 by an angle a1 relative to the plane spread between the supporting points. If, as is apparent from FIGS. 4, 5 and 6, the two guiding rods 5 and 6 are outwardly displaced along the spindle in the sense of double arrows 11 and 12 by substantially equal displacement paths, this will result in the adjustment of an angle $\alpha_2$ as illustrated in FIG. 6, which itself, in turn, is smaller than the angle $\alpha_1$. Further displacement of the guiding rods 6 and 5 into their outward positions in the direction of double arrows 11 and 12 will lead to a further reduction of the angle $\alpha_3$ apparent from FIG. 9 such that a third angular position may be assumed. On the whole, precise pivoting by small angles, departing from angle $\alpha_1$ to angle $\alpha_3$, is obtained by relatively easily controllable and relatively large adjustment paths along the spindles in the direction of double arrows 11 and 12.

From FIGS. 10 to 15 it is apparent that the displacement of the two spindle drives in the same axial direction effects pivoting of the platform 1, and hence of the axes of the beam engines, about a further axis. The pivotal movement is schematically indicated by the curved double arrow 17 in FIGS. 10 and 13, the pivoting of the plane of the carrier 1 from the position shown in FIGS. 3, 6 and 9 being apparent from the illustration according to FIGS. 12 and 15. The same, of course, holds for FIG. 12, wherein in FIG. 10 the guiding rod with its cardan joint 7 has been moved into a position neighboring the carrier whereas the guiding rod 6 as well as the associated cardan joint 8 have been displaced outwardly into a position facing away from the carrier 1, thereby effecting the tilting movement about the ball-and-socket joint 13 and the ball-and-socket joint 15. On the whole, multiaxial adjustment is made feasible each by actuating the spindle drives and displacing the cardan joints 7 and 8 along the spindle, wherein a four-bar arch is each active for the transmission of force, thereby enabling large reaction forces to be safely absorbed by leightweight-design elements. Due to the large displacement paths feasible with linear drives, it is also feasible to safely convert large displacement paths into relatively small angular adjustments.

We claim:

1. An actuation device for adjusting structural members on a satellite to be oriented relative to the satellite, the actuation device comprising:

(a) two independently operable linear actuators;

(b) two guiding rods each of which is linked at one end to a respective one of said linear actuators by means of a cardan link and connected at an opposite end to the structural member by a ball-and-socket joint; and (c) at least one supporting rod, wherein the supporting rod is connected between the satellite and the structural member via ball-and-socket joints; and further wherein the guiding rods and the supporting rod engage points of the structural member that form a polygon, with angular positions of the guiding rods relative to each other and relative to the linear actuators being such that angular displacements of the structural member relative to the satellite can be made about a plurality of axes.

2. An actuation device according to claim 1, wherein the linear actuators comprise spindle drives and the guiding rods are connected with the linear actuators so as to be pivotable about an axis intersecting with, or crossing, an axis of the spindle.

3. An actuation device according to claim 1, wherein the linear actuators are arranged in a common plane and are coaxial with each other.

4. An actuation device according to claim 1 wherein the structural member comprises at least one ion engine.

5. An actuation device according to claim 1, wherein each linear actuator cooperates with the structural member via a four-bar arch.

6. An actuation device for adjusting structural members on a satellite to be oriented relative to the satellite, the actuation device comprising:

(a) two independently operable linear actuators; and (b) two guiding rods each of which is linked to a respective one of said linear actuators by means of a cardan link and connected to the structural member via a ball-and-socket joint;

wherein the structural member to be oriented is linked directly to the satellite via a ball-and-socket joint, and wherein the angular positions of the guiding rods relative to each other and relative to the linear actuators are such that angular displacements of the structural member relative to the satellite can be made about several axes.

* * * * *